United States Patent [19]

Wellman et al.

[11] Patent Number: 4,918,312

[45] Date of Patent: Apr. 17, 1990

[54] DEWAR COLDFINGER

[75] Inventors: William H. Wellman; Wallace Y. Kunimoto, both of Goleta, Calif.

[73] Assignee: Santa Barbara Research Center, Goleta, Calif.

[21] Appl. No.: 275,293

[22] Filed: Nov. 23, 1988

[51] Int. Cl.[4] .............................................. G01J 5/06
[52] U.S. Cl. ...................................... 250/352; 62/51.1
[58] Field of Search .................. 250/352; 62/51.1, 51.2

[56] References Cited

U.S. PATENT DOCUMENTS

| 4,206,354 | 6/1980 | Small, Jr. | 250/352 |
| 4,462,214 | 7/1984 | Ito | 62/51.1 |
| 4,487,037 | 12/1984 | Meignin et al. | 250/352 |
| 4,528,449 | 7/1985 | Gordon et al. | 250/352 |

FOREIGN PATENT DOCUMENTS 0177416 9/1985 France ................................. 62/51.1

Primary Examiner—Carolyn E. Fields
Attorney, Agent, or Firm—W. C. Schubert; W. K. Denson-Low

[57] ABSTRACT

An infrared detector assembly (10) of the type used in munitions and night vision systems having improved coldfinger dewar tube (22). Such detectors include a tubular coldfinger which is surrounded by a vacuum and has a cold end (24) which supports the infrared detector array (30) and related components, and an opposite warm end (26). In accordance with this invention, the coldfinger tube is a two-material composite structure having plastic (44) and metal (42) layers. The plastic layer provides the necessary bending stiffness to support the cold end components while minimizing heat transfer rate between the warm and cold ends of the tube. The metal film layer provides a gas seal to preserve the integrity of the dewar vacuum, but is sufficiently thin to provide a minimal increase in thermal conductivity. The compositie coldfinger tube in accordance with this invention features lower overall heat conductivity thus minimizing cryogenic cooling requirements while providing the necessary bending stiffness. Due to the reduction in thermal capacitance provided by this assembly, the cool-down time for the cold end components can also be minimized.

11 Claims, 3 Drawing Sheets

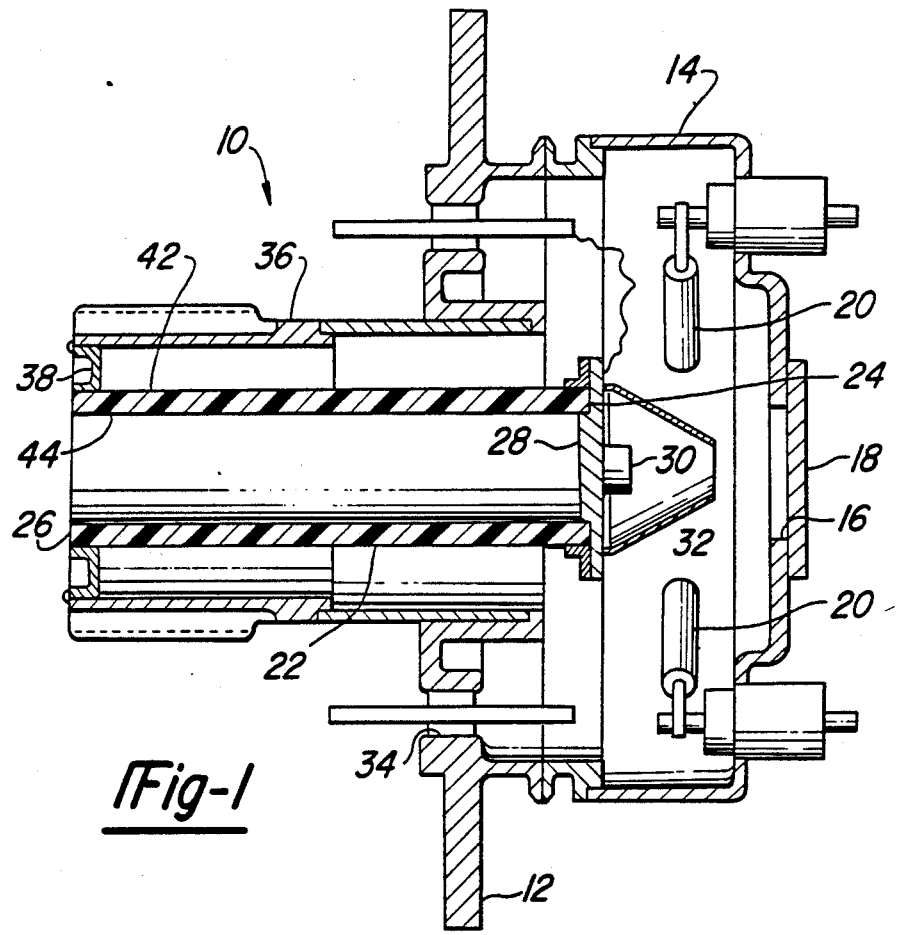
*Fig-1*
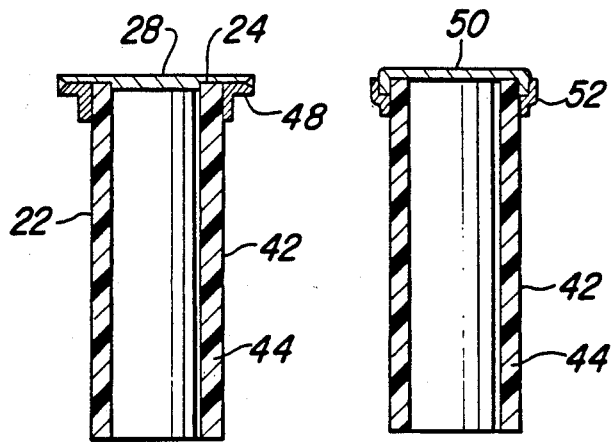
*Fig-2*  *Fig-3*

DEWAR COLDFINGER

BACKGROUND OF THE INVENTION

1. Field of the Invention

This invention relates to an improved infrared seeker assembly and particularly to one having a novel dewar coldfinger construction.

2. Description of the Prior Art

Infrared detection systems are often used in conjunction with munitions and night vision systems for sensing electromagnetic radiation in the range of wavelength of one to fifteen micrometers. Because of many of such systems have detector arrays which are most sensitive when operated at about 80° K., a cooling system is required to produce and maintain the required low operating temperatures. Typically, such cooling systems either take the form of a cryostat using the Joule-Thompson effect, or a Stirling cycle cryoengine. The cooling systems are used in conjunction with a dewar in which the infrared detector is placed. The dewar is evacuated to remove gasses which would otherwise occupy the area surrounding the detector so that potential heat loss through convection and conduction is minimized. The evacuated dewar also prevents moisture from condensing on the detector. The dewar has a cylindrical tube referred to as a "coldfinger" having an end which is cooled and supports the detector and related components.

A number of design constraints affect the design of the dewar coldfinger. Since the coldfinger is a cantilever supported cylinder, it must have sufficient bending stiffness to control deflection of the infrared detector. Such requirements become particularly significant when the infrared seeker assembly is used as part of munitions subjected to intense vibration and high levels of boost-phase acceleration. Another significant design parameter is the extent to which heat is transferred from the warm end of the coldfinger cylinder to its cold end. Reductions in heat transfer rate allow the capacity of the cryogenic cooling system to be reduced. Unfortunately, reduction in the cross-sectional solid area of the coldfinger tube for reducing heat transfer adversely affects its bending stiffness for a given material and tube diameter. Another design consideration is the cool-down rate for the cold end components of the coldfinger. Since infrared seekers are often used in expendable munitions which must acquire a target soon after (or before) their launch, cool-down time becomes a critical consideration for some applications.

Prior art dewar coldfingers have been formed from various materials. Glass has been used since it has low thermal conductivity, but, unfortunately, does not yield low conductance coldfingers because it is too fragile when it is made in decreased thicknesses desired to minimize conduction heat loads. Examples of such glass dewar coldfingers are described by U.S. Pat. Nos. 3,851,173 and 3,719,990. Other prior art coldfingers have been made form various metals, for example, as described by U.S. Pat. No. 4,528,449. Metals are less fragile than glass but still cannot be made thin enough to obtain lower heat loads than glass due to their higher thermal conductivity. Plastic materials have also been used for non-evacuated detector units and have obtained low heat loads. However, due to their porosity, plastic coldfingers have not been used in vacuum type dewars.

SUMMARY OF THE INVENTION

In accordance with the foregoing, it is an object of this invention to provide an improved dewar coldfinger featuring low cool-down time and low thermal conductivity, while maintaining sufficient bending stiffness and resistance to gas permeation. In accordance with this invention, a dewar coldfinger is provided which is a binary material structure with a thin metal layer for vacuum integrity, and a thicker plastic layer provided for strength. Extremely low cryogenic heat loads result from the thinness of the metal coating and the low thermal conductivity of the plastic layer.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a longitudinal cross-sectional view through an infrared detector assembly in accordance with this invention.

FIG. 2 is a longitudinal cross-section of a coldfinger tube configuration in accordance with a first embodiment of this invention.

FIG. 3 is a longitudinal cross-sectional view of a coldfinger tube in accordance with a second embodiment of this invention.

DETAILED DESCRIPTION OF THE PREFERRED EMBODIMENTS

Figure 4:
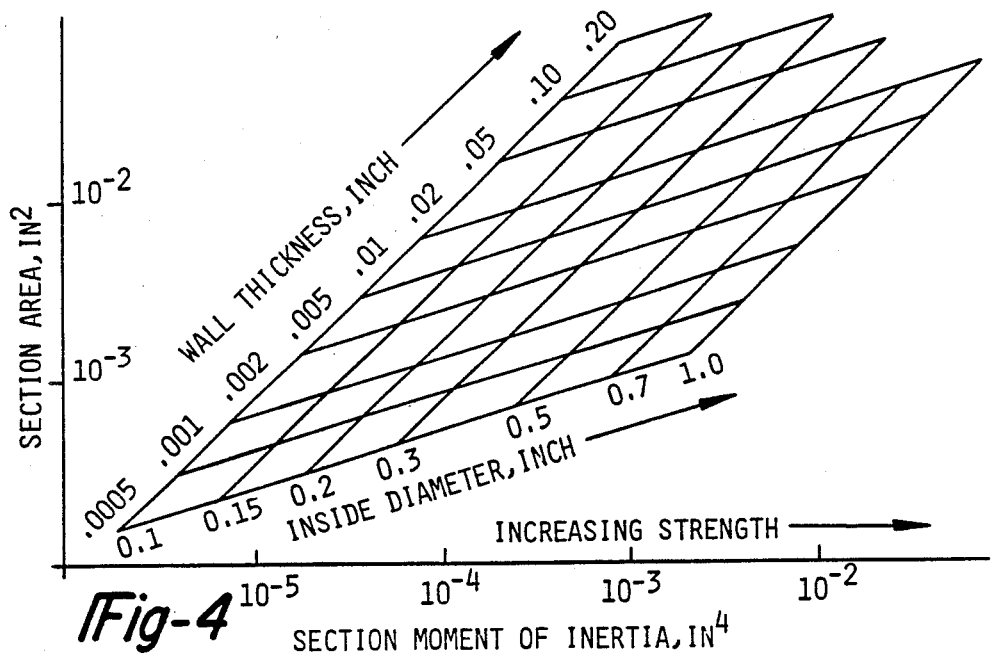
FIG. 4 is a log-log plot relating section area to section stiffness for various coldfinger configurations and further related to wall thickness and inside diameter of the coldfinger.

An infrared detector assembly in accordance with the present invention is shown in FIG. 1 and is generally designated there by reference number 10. Detector assembly 10 is secured to a supporting structure by mounting flange 12. Housing 14 encloses the forward end of the device and has a central aperture 16 covered by infrared window 18. Getters 20 are provided to absorb any outgasses which escape into the interior cavity of housing 14. Coldfinger 22 is a hollow cylinder defining cold end 24 and warm end 26 (referring to their temperatures during use). As mentioned previously, a cryogenic cooling system is installed within coldfinger 22 to produce the necessary low temperatures at cold end 24. Cold end 24 is enclosed by end cap 28 to which an infrared detector array 30 is mounted. Detector 30 is enclosed by cold shield 32. Wiring associated with detector 30 penetrates mounting flange 12 at feed-through ports 34. Detector assembly 10 has a double wall construction to minimize heat transfer to coldfinger cold end 24. Outer tube 36 fits over coldfinger 22 and its rear-most end is sealed by circular flange 38.

Cylindrical coldfinger 22 is a two-material structure with a thin metal outer layer 42 and a thicker plastic layer 44 provided for strength. The plastic material making up layer 44 should be a rigid, dimensionally stable, and machinable material. For example, DuPont Vespel (trademark for polypyromellitimide) is one type of rigid polyimide which is suitable for this application. Plastic layer 44 is made from open cylinder of machined or extruded Vespel material and would have a thickness generally within the range of between 0.005 to 0.050 inches thick, depending on the application. Appropriate materials for metal outer layer 42 include chromium-nickel alloys such as Nichrome (trademark for nickel-base alloy containing chromium and iron), and iron-nickel alloys such as Invar (trademark for iron-nickel alloy containing small amounts of carbon, manganese and silicon), which are applied to the exterior of plastic layer 44 through techniques such as vacuum deposition, vacuum sputtering, or flame-spraying. Nichrome is comprised of 61% nickel and 15% chromium with the balance being iron; Invar-36 is comprised of 36% nickel, 0.12% carbon, 0.35% manganese and 0.30% silicon with the balance being iron. Various thicknesses for metal layer 42 can be provided, for example, a range from 10,000 A to 0.0002 inches thick could be used, depending on the level of gas permeation which is acceptable.

One approach for manufacturing coldfinger 22 would be to coat convenient lengths of tubing which would then be cut to the appropriate lengths. In order to provide surfaces acceptable for welding, the exterior of the two coldfinger ends can be electroplated with a metal such as nickel to increase the metal thickness by at least 0.005 to 0.010 inches. Preferably, the remainder of the coldfinger 22 external surface would be masked during this plating to leave only the thin metal sheathing.

One preferred approach for attaching end cap 28 onto coldfinger tube 22 is described with reference to FIG. 2. As shown, end cap 28 is placed on coldfinger cold end 24 and welded to plated-up flanges 48. FIG. 3 shows an alternate embodiment for the construction of coldfinger 22 in which end cap 50 is placed onto coldfinger cylinder 22 after deposition of metal outer layer 42 but before the addition of further plating. Thereafter, a plating buildup 52 is applied to seal the tube. Base ring flange 38 can be affixed to coldfinger cylinder 22 by the various methods described previously.

The design parameters and material selection consideration for coldfinger 22 in accordance with this invention are best described with reference to FIGS. 4 through 6. FIG. 4 relates the strength of a coldfinger tube 22 to section area, wall thickness, and diameter for a single material, cylindrical coldfinger. Section moment of inertia is plotted along the horizontal axis which represents a fundamental structural parameter representing bending stiffness. Since the primary mode for heat loss is conduction along the length of coldfinger 22, section area plotted along the vertical axis is used as a measure of heat load. Tube wall thickness and inside diameter are also plotted as diagonal lines. For any required stiffness, it is clear from FIG. 4 that heat load is minimized by decreasing thickness and increasing diameter of coldfinger tube 22. The relationships illustrated in FIG. 4 are based on the fundamental facts that the tip deflection of an end-loaded cylinder having inner and outer radii $R_o$ and $R$, respectively, is given by:

$$d = (wL^3)/(3EI)$$

where
L = length, (in.)
W = tip load, (lb.)
E = Young's modulus, (psi)

I = section moment of inertia = $\pi(R^4 - R_o^4)4$, (in$^4$)
And, the heat load q is given by:

$$q = A\mu/L, (W)$$

where
L = length, (in.)
$\mu$ = thermal conductivity,
A = section area = $\pi(R^2 - R_o^2)$, (in$^2$)

Figure 5:
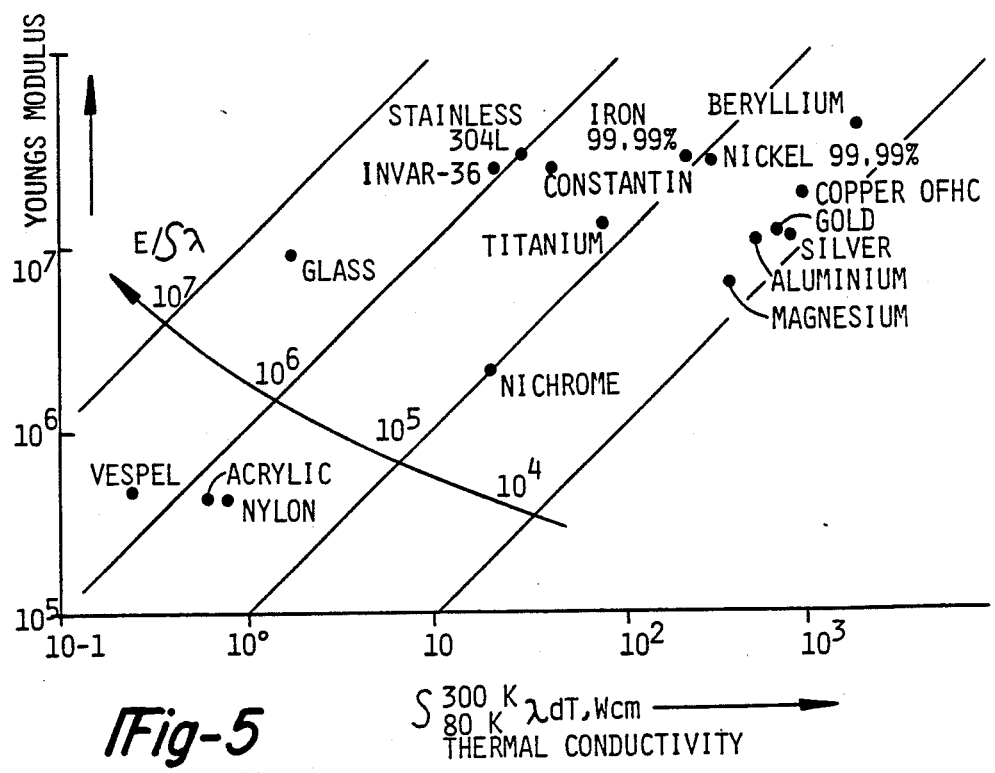
FIG. 5 is a log-log plot relating stiffness and thermal conductivity of various candidate coldfinger materials.

Various material factors are shown in FIG. 5 as a cross-plot of thermal conductivity versus Young's modulus (E). Diagonal lines are added to represent a relevant "figure-of-merit" that assesses material suitability for coldfinger applications. The figure-of-merit is the ratio of Young's modulus versus thermal conductivity. The thermal conductivity values plotted along the horizontal axis are taken across a range which are typical coldfinger tube temperatures of 80° K. at cold end 24, and 300° K. at warm end 26. As shown by that figure, a high figure-of-merit value of $2 \times 10^6$ W/cm-psi is attained by Vespel material. This plastic material is two to ten times better than typical coldfinger metals like titanium and 304 stainless steel, which have figure-of-merit values of $2 \times 10^5$ to $1 \times 10^6$ W/cm-psi, respectively. These differences mean that dramatic coldfinger heat load reductions can be realized without compromise in structural integrity by making an optimum choice of materials. Although Invar-36 metal shows an excellent figure-of-merit with respect to plastic materials, it cannot be made in a geometry that provides the low heat load capabilities of the present invention. Likewise, glass has a better figure-of-merit than Vespel material but cannot be made in small enough diameters to satisfy the requirements. Thus, as shown by the figure, Vespel material makes an excellent material choice in terms of its stiffness and thermal conductivity for coldfinger 22.

Figure 6:
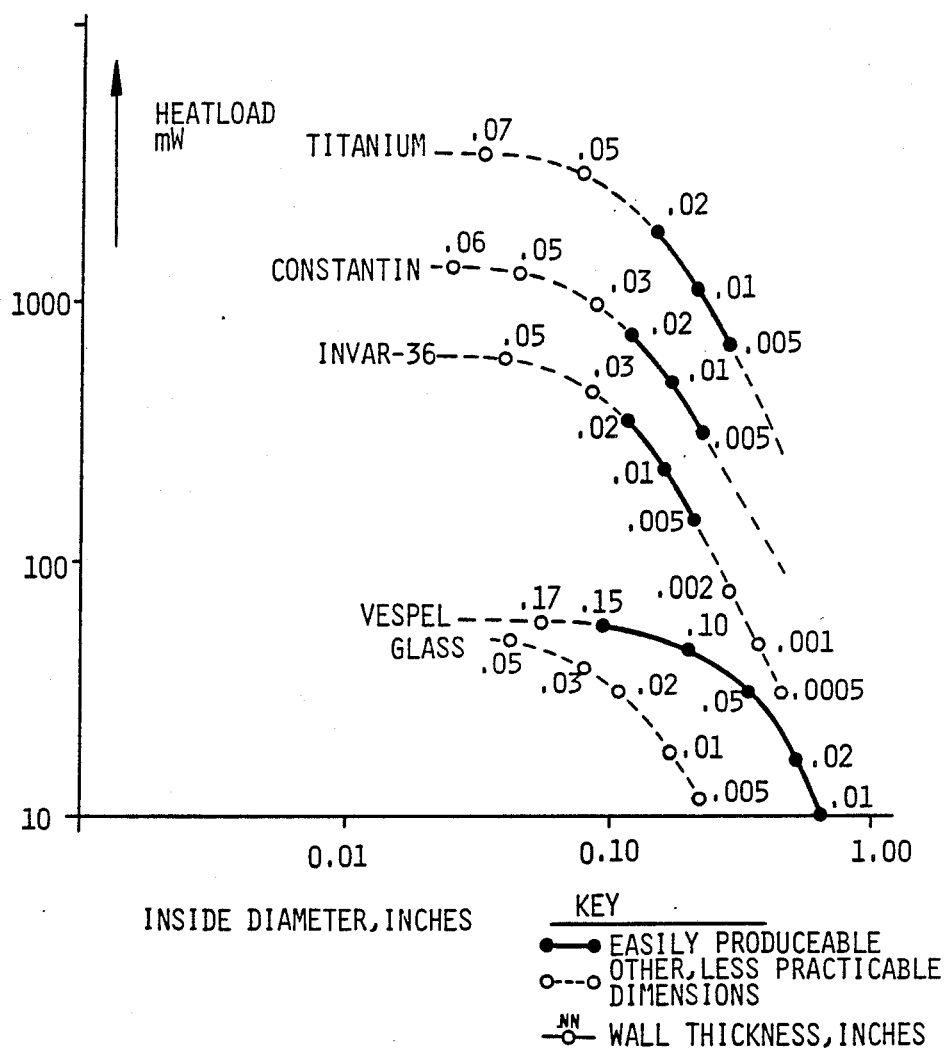
FIG. 6 is a log-log plot relating inside diameter of the coldfinger with heat load for various coldfinger thicknesses and materials.

FIG. 6 combines the material properties and geometric factors previously discussed, and shows heat load as a function of coldfinger diameter for different common materials, all for conditions of equal coldfinger strength based on an example coldfinger made of Invar-36 metal having a 0.208 in. bore diameter, 0.005 inch thickness and a 1.25 in. length. For this figure, wall thickness is adjusted to maintain a constant stiffness as inside diameter and materials are changed. Curves are drawn to show theoretical trends, with dashes for thicknesses which are impracticable, and solid otherwise. The curve for glass is entirely dashed showing that its thickness cannot be optimized its material characteristics. Further, it is noted that Vespel material is significantly superior in heat load as compared with the other materials shown. The addition of metal film 42 necessary for providing a gas barrier for sealing the plastic will only add approximately 2.2 to 4.4 mW to the heat load for a coldfinger having a diameter of 0.375 inch. The combined heat load of this unique dual material structure is believed to provide at least a fourfold improvement in heat load over prior art configurations without sacrificing stiffness. The advantages over the use of prior art materials becomes even more dramatic with larger diameter coldfinger tube bores and smaller lengths than the example case.

While the above description constitutes the preferred embodiments of the present invention, it will be appreciated that the invention is susceptible to modification, variation and change without departing from the proper scope and fair meaning of the accompanying claims.

What is claimed is:

1. An infrared detector assembly comprising:
   a dewar housing for providing an evacuated cavity,
   an elongated hollow coldfinger tube within said dewar housing,
   means for cooling one end of said tube thereby defining a cold end and a warm end of said tube,
   an infrared detector mounted at said tube cold end, and
   said tube having a layer of polymer material which is coated with a metal film, with said polymer layer providing strength for supporting said detector, and said metal film layer inhibiting gas permeation through said tube for preserving the integrity of said evacuated cavity.

2. An infrared detector assembly according to claim 1 wherein said polymer material is a rigid polyimide.

3. An infrared detector assembly according to claim 1 wherein said polymer material is polypyromellitimide.

4. An infrared detector assembly according to claim 1 wherein said metal film is a chromium-nickel alloy.

5. An infrared detector assembly according to claim 1 wherein said metal film is an iron-nickel alloy.

6. An infrared detector assembly according to claim 1 wherein said metal film is between 10,000 A and 0.0002 inches in thickness.

7. An infrared detector assembly according to claim 1 wherein said detector assembly further comprises an end cap affixed to said coldfinger tube at said cold end with said detector mounted to said end cap.

8. An infrared detector assembly according to claim 7 wherein a flange is formed at an end of said coldfinger tube by plating metal onto said tube and wherein said end cap is welded to said flange.

9. An infrared detector assembly according to claim 7 wherein said end cap is mounted to said coldfinger tube and a metal layer is plated onto said end cap and said tube to secure said end cap.

10. An infrared detector assembly according to claim 1 wherein said polymer layer is between 0.005 and 0.050 inches thick.

11. An infrared detector assembly according to claim 1 wherein said metal film is applied to the radially outer surface of said coldfinger tube.

* * * * *